(12) United States Patent
Nilsson et al.

(10) Patent No.: US 10,189,478 B2
(45) Date of Patent: Jan. 29, 2019

(54) METHOD FOR FAST CHANGE OF GEARS IN A VEHICLE COMPRISING A HYBRID DRIVELINE

(71) Applicant: Scania CV AB, Sodertalje (SE)

(72) Inventors: Mattias Nilsson, Södertälje (SE); Fredrik Sundén, Hägersten (SE); Mats Liwell, Södertälje (SE); Afram Kourie, Södertälje (SE)

(73) Assignee: SCANIA CV AB (SE)

( * ) Notice: Subject to any disclaimer, the term of this patent is extended or adjusted under 35 U.S.C. 154(b) by 394 days.

(21) Appl. No.: 15/032,198

(22) PCT Filed: Nov. 13, 2014

(86) PCT No.: PCT/SE2014/051349
§ 371 (c)(1),
(2) Date: Apr. 26, 2016

(87) PCT Pub. No.: WO2015/076724
PCT Pub. Date: May 28, 2015

(65) Prior Publication Data
US 2016/0264145 A1     Sep. 15, 2016

(30) Foreign Application Priority Data

Nov. 21, 2013 (SE) ...................................... 1351381

(51) Int. Cl.
*B60W 30/19* (2012.01)
*B60K 6/48* (2007.10)
(Continued)

(52) U.S. Cl.
CPC .............. *B60W 30/19* (2013.01); *B60K 6/36* (2013.01); *B60K 6/387* (2013.01); *B60K 6/40* (2013.01);
(Continued)

(58) Field of Classification Search
None
See application file for complete search history.

(56) References Cited

U.S. PATENT DOCUMENTS 5,150,628 A * 9/1992 Alfredsson ............. F16H 3/006
74/330
5,337,848 A * 8/1994 Bader ....................... B60K 6/36
180/65.25
(Continued)

FOREIGN PATENT DOCUMENTS

DE   10 2009 000 710 A1   8/2010
DE   10 2009 012223 A1   9/2010
(Continued)

OTHER PUBLICATIONS

International Search Report dated Mar. 5, 2015 in corresponding PCT International Application No. PCT/SE2014/051349.
(Continued)

*Primary Examiner* — Justin Holmes
(74) *Attorney, Agent, or Firm* — Ostrolenk Faber LLP

(57) ABSTRACT

A method for shifting in a vehicle (1) with a hybrid powertrain (2), the powertrain includes: a combustion engine (3), an electric machine (4), a gearbox (6) with an input shaft (10) and a main shaft (14), wherein the combustion engine (3) and the electric machine (4) are connected to the input shaft (10); and a lay shaft (16), via gear sets (50, 52 and 58, 60, 62) is connected to the input shaft (10) and the main shaft (14), so that they form a split gear unit (13) and a main gear unit (15). The method has the steps: a) to bring the main gear unit (15) into a substantially zero torque state, b) in the event the input shaft (10) and the lay shaft (16) must both be accelerated or decelerated: to initiate synchronization of the speed of the lay shaft (16) with, on the one hand, the speed of the input shaft (10), and, on the other hand, the speed of the main shaft (14), at a joint first point in time (t1), c) to
(Continued)

engage a gear in the split gear unit (13) when the speed of the lay shaft (16) has been synchronized with the speed of the input shaft (10) at a second point in time (t2), and d) to engage a gear in the main gear unit (15) when the speed of the lay shaft (16) has been synchronized with the speed of the main shaft (14) at a third point in time (t3). Also a hybrid powertrain (2) and a vehicle (1), as well as a computer program (P) and a computer program product are disclosed, which perform the method.

10 Claims, 6 Drawing Sheets

(51) Int. Cl.
  *B60W 10/08* (2006.01)
  *B60W 10/11* (2012.01)
  *F16H 3/12* (2006.01)
  *F16H 3/091* (2006.01)
  *F16H 61/04* (2006.01)
  *B60K 6/36* (2007.10)
  *B60K 6/40* (2007.10)
  *B60K 6/547* (2007.10)
  *B60W 10/06* (2006.01)
  *B60W 20/10* (2016.01)
  *B60W 20/30* (2016.01)
  *B60W 20/40* (2016.01)
  *B60K 6/387* (2007.10)
  *B60W 30/18* (2012.01)
  *F16H 63/50* (2006.01)
  *B60W 10/02* (2006.01)
  *B60W 20/00* (2016.01)

(52) U.S. Cl.
  CPC .............. *B60K 6/48* (2013.01); *B60K 6/547* (2013.01); *B60W 10/06* (2013.01); *B60W 10/08* (2013.01); *B60W 10/11* (2013.01); *B60W 20/10* (2013.01); *B60W 20/30* (2013.01); *B60W 20/40* (2013.01); *F16H 3/091* (2013.01); *F16H 3/12* (2013.01); *F16H 3/126* (2013.01); *F16H 61/0403* (2013.01); *B60K 2006/4825* (2013.01); *B60W 10/02* (2013.01); *B60W 20/00* (2013.01); *B60W 30/18* (2013.01); *B60W 2300/12* (2013.01); *B60W 2510/083* (2013.01); *B60W 2510/104* (2013.01); *B60W 2510/1005* (2013.01); *B60W 2510/1015* (2013.01); *B60W 2540/10* (2013.01); *B60W 2710/021* (2013.01); *B60W 2710/0666* (2013.01); *B60W 2710/081* (2013.01); *B60W 2710/082* (2013.01); *B60W 2710/083* (2013.01); *B60W 2710/1005* (2013.01); *B60W 2710/1011* (2013.01); *B60W 2710/1038* (2013.01); *B60Y 2200/92* (2013.01); *B60Y 2300/188* (2013.01); *B60Y 2300/19* (2013.01); *F16H 61/0437* (2013.01); *F16H 2061/0422* (2013.01); *F16H 2063/506* (2013.01); *Y02T 10/6221* (2013.01); *Y02T 10/6252* (2013.01); *Y02T 10/6286* (2013.01); *Y10S 903/909* (2013.01); *Y10S 903/919* (2013.01); *Y10S 903/93* (2013.01); *Y10S 903/951* (2013.01)

(56) References Cited

U.S. PATENT DOCUMENTS

| 8,647,232 B2 | 2/2014 | Guggolz et al. | |
|---|---|---|---|
| 2010/0323845 A1 | 12/2010 | Miller et al. | 477/75 |
| 2011/0224855 A1* | 9/2011 | Schneider | B60K 17/28 701/22 |
| 2012/0031230 A1 | 2/2012 | Guggolz et al. | 74/665 L |
| 2012/0115675 A1 | 5/2012 | Glueckler et al. | 477/5 |
| 2013/0296127 A1 | 11/2013 | Shelton et al. | |

FOREIGN PATENT DOCUMENTS

| DE | 10 2011 080 849 A1 | 2/2013 |
|---|---|---|
| EP | 1 507 678 B1 | 7/2007 |
| WO | WO 03/097401 A1 | 11/2003 |

OTHER PUBLICATIONS

Supplementary European Search Report dated Jun. 9, 2017 in corresponding European Patent Application No. EP 14 86 3135 (3 total pages).

* cited by examiner

METHOD FOR FAST CHANGE OF GEARS IN A VEHICLE COMPRISING A HYBRID DRIVELINE

CROSS-REFERENCE TO RELATED APPLICATIONS

The present application is a 35 U.S.C. §§ 371 national phase conversion of PCT/SE2014/051349, filed Nov. 13, 2014, which claims priority of Swedish Patent Application No. 1351381-7, filed Nov. 21, 2013, the contents of which are incorporated by reference herein. The PCT International Application was published in the English language.

BACKGROUND OF THE INVENTION AND PRIOR ART

The present invention relates to a method for shifting in vehicles with a hybrid powertrain, a hybrid powertrain and a vehicle comprising such a hybrid powertrain.

A hybrid-driven vehicle is operated by a combustion engine and an electric machine, which interact to deliver a desired output and to, among others, achieve a good fuel economy in the vehicle. The electric machine may also be used to brake the vehicle, wherein the electric machine functions as a generator and thus returns energy to an electric accumulator in the vehicle. The vehicle is also equipped with a gearbox to distribute power from the combustion engine and the electric machine, and to achieve a suitable gear ratio for the vehicle's driving wheels.

In automated manual transmissions (AMT) with a single input shaft, shifting is carried out by disconnecting the combustion engine from the input shaft and bringing the gearbox into a substantially zero torque state, disengaging the current gear, synchronizing the input shaft and a lay shaft to the next gear, engaging the next gear and subsequently adding a torque on the input shaft by connecting and accelerating the combustion engine and/or accelerating the electric machine. Such a transmission may also comprise a split gear unit between the input shaft and the lay shaft.

When an automated manual transmission is included in a hybrid powertrain, the split gear unit is shifted first, synchronizing the lay shaft's speed with the input shaft's speed via the split gear unit, so that it corresponds to the next gear ratio, and subsequently, with the help of the electric machine, synchronizing the input shaft's and the lay shaft's speed with the speed corresponding to the next gear of a main shaft. Doing this sequentially entails an undesirably long time to complete the shifting, which entails that the vehicle's speed may be reduced unwittingly, which thus requires more energy and an increased fuel consumption to accelerate the vehicle to a desired speed.

DE102011080849 shows how the shifting time may be shortened by simultaneously shifting a main gearbox and a range gearbox.

DE102009000710 shows a transmission equipped with a braking device and an electric motor to control the shifting.

SUMMARY OF THE INVENTION

Despite prior art solutions, there is a need to develop a transmission which is equipped with a split gear unit and main gear unit, which transmission has a brief shifting time.

The objective of the present invention is thus to provide a transmission, which is equipped with a split gear unit and a main gear unit, which transmission has a brief shifting time.

This objective is achieved with a method for shifting in a vehicle with a hybrid power-train of the type specified above.

By shifting the split gear unit and simultaneously synchronizing the input shaft's speed with the speed of the lay shaft and the main shaft, a brief shifting time may be achieved. As an example, the time for shifting between certain gear steps may be shortened by a period of around 0.25 seconds, which corresponds to a reduction in time by approximately 50%.

According to one embodiment of the invention, the synchronization of the lay shaft's speed with, on the one hand, the speed of the input shaft, and, on the other hand, the speed of the main shaft, is initiated at a joint first point in time, with a synchronization means arranged at the split gear unit. This entails a brief shifting time, since the synchronization means arranged at the split gear unit may be used to simultaneously impact the synchronization of the lay shaft's speed with, on the one hand, the speed of the input shaft, and, on the other hand, the speed of the main shaft.

The above objectives are also achieved with a hybrid powertrain of the type specified above according to the invention, and by a vehicle of the type specified above.

Other advantages of the invention are set out in the detailed description below.

BRIEF DESCRIPTION OF THE DRAWINGS

Below is a description, as an example, of preferred embodiments of the invention with reference to the enclosed drawings, in which.

DETAILED DESCRIPTION OF PREFERRED EMBODIMENTS OF THE INVENTION

Figure 1:
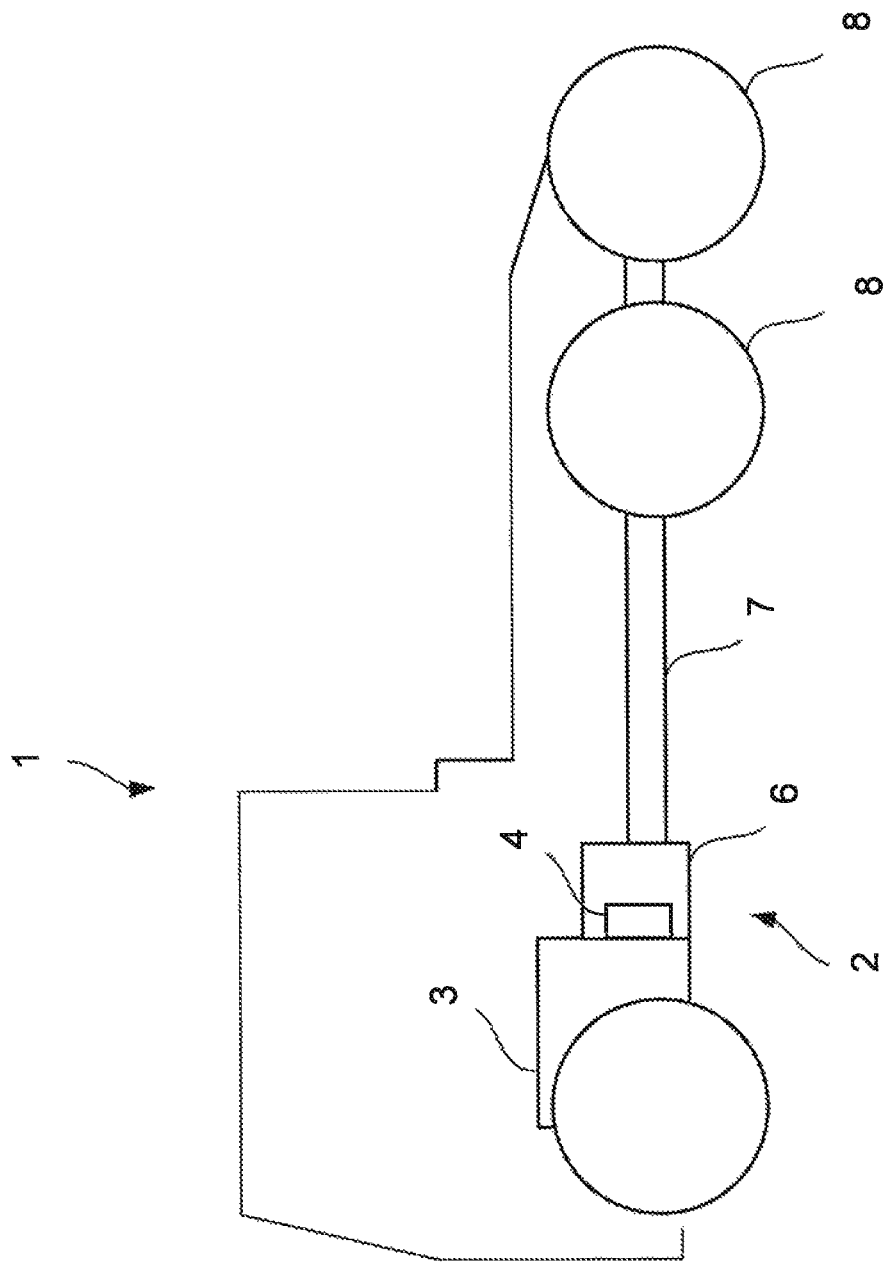
FIG. 1 shows a schematic side view of a vehicle with a powertrain according to the present invention.

FIG. 1 shows a schematic side view of a vehicle 1, comprising a hybrid powertrain 2 with a combustion engine 3 and an electric machine 4, which are connected to a gearbox 6. The gearbox 6 is also connected to the driving wheels 8 of the vehicle 1 via a propeller shaft 7.

Figure 2:
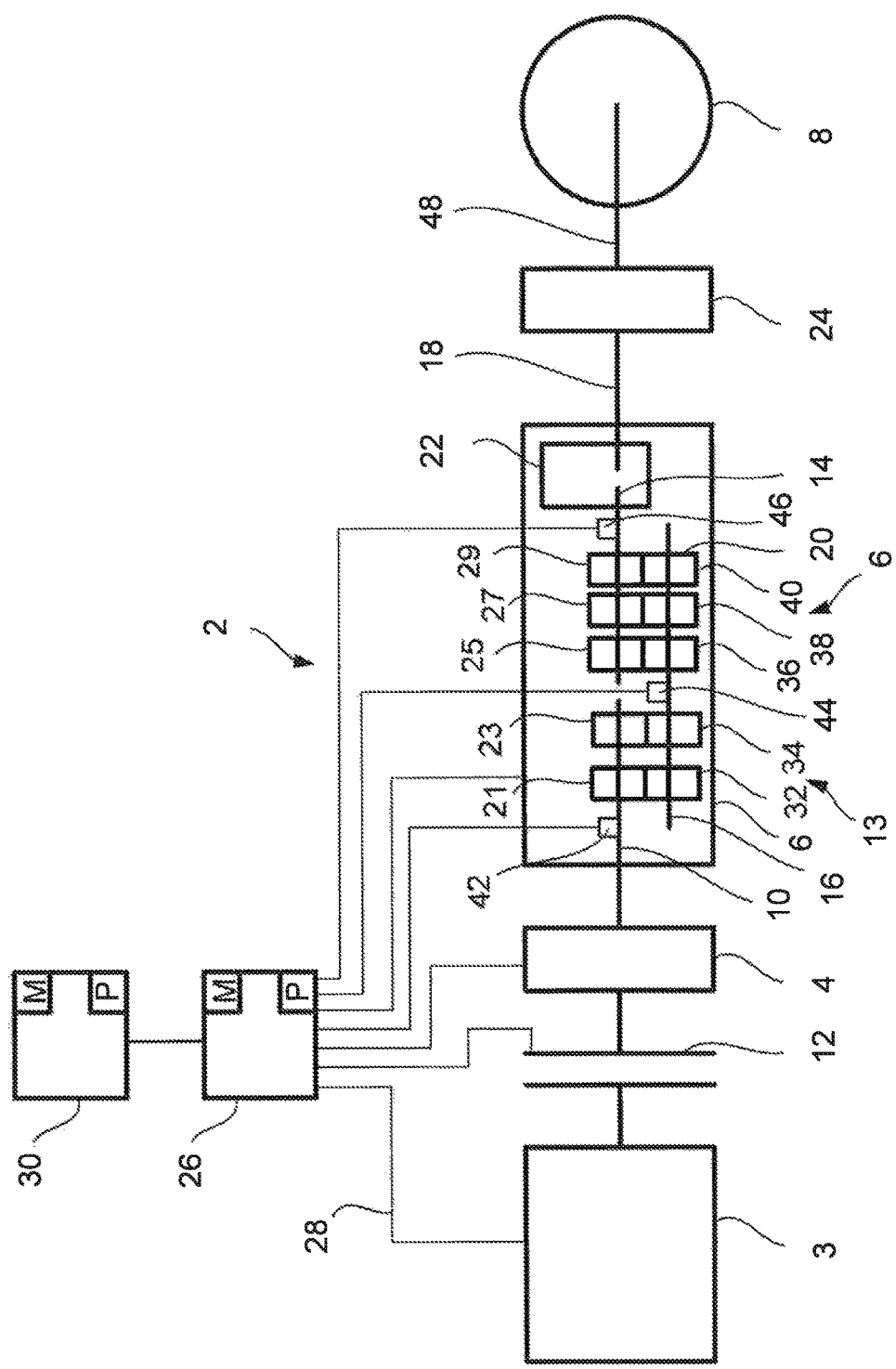
FIG. 2 shows a schematic side view of a powertrain according to the present invention.

FIG. 2 shows a schematic view of a hybrid powertrain 2, comprising a combustion engine 3 and an electric machine 4, which are connected to an input shaft 10 of the gearbox 6. The combustion engine 3 may be connected to and disconnected from the input shaft 10 via a coupling device 12, which may be manually and/or automatically maneuverable. The gearbox 6 is an automated manual transmission (AMT) of a split type and comprises a split gear unit 13 and a main gear unit 15. The split gear unit 13 connects an input shaft 10 with a lay shaft 16. The main gear unit 15 connects the lay shaft 16 with a main shaft 14. On the input shaft 10, the lay shaft 16 and the main shaft 14, one or several transmission elements 20 in the form of cogwheels 21, 23, 25, 27, 29 and gears 32, 34, 36, 38, 40 are arranged, connecting the respective shafts 10, 16, 14. A first speed sensor 42 is arranged at the input shaft 10 to detect the speed of the input shaft 10, a second speed sensor 44 is arranged at the lay shaft 16 to detect the speed of the lay shaft 16 and a third speed sensor 46 is arranged at the main shaft 14 to detect the speed of the main shaft 14. Between the main shaft 14 and an output shaft 18, a retarder 22 is arranged. The output shaft 18 is connected to a final gear 24, which in turn is connected to the driving wheels 8 of the vehicle 1 via a driving shaft 48. An electronic control device 26 is connected to the combustion engine 3, the coupling device 12, the electric machine 4, the gearbox 6 and the speed sensor via electrical conductors 28. Instead of transmitting signals through the electrical conductors 28, signals between the electronic control device 26 and the combustion engine 3, the coupling device 12, the electric machine 4, the gearbox 6, and the speed sensors may be transmitted wirelessly. The electronic control device 26 may comprise a memory M and a computer program P. It is also possible to connect a computer 30 to the control device 26.

Figure 3:
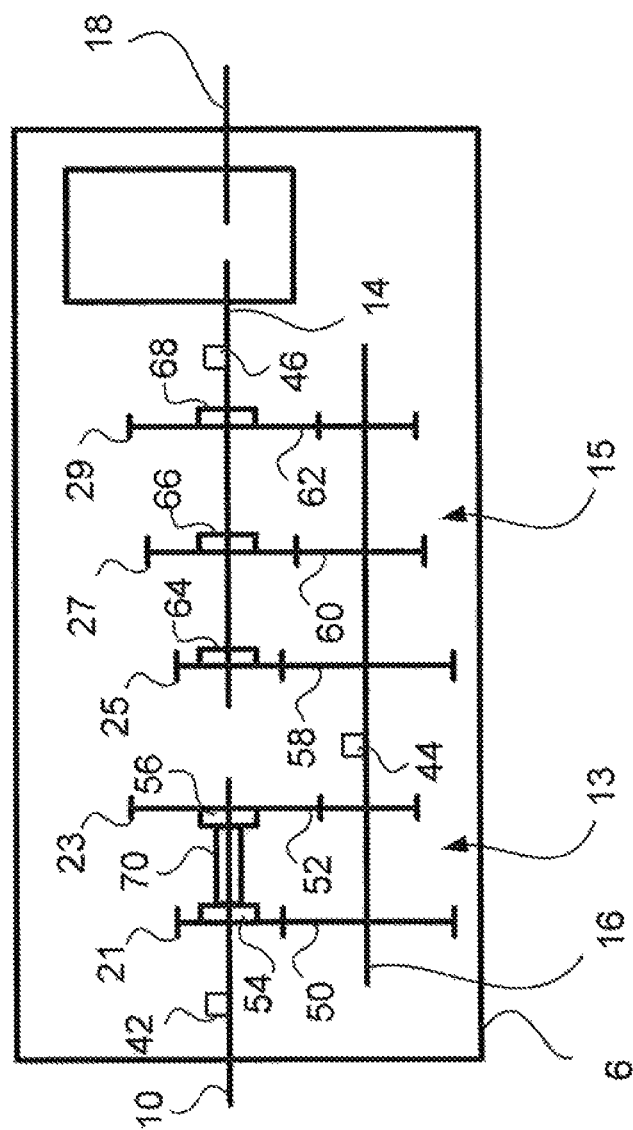
FIG. 3 shows a cross section through a schematically displayed gearbox, which is included in the powertrain according to the present invention.

FIG. 3 shows schematically a gearbox 6, which is included in the hybrid powertrain 2 according to the present invention. The gearbox 6 is, as mentioned above, an automated manual transmission of a split type and comprises a split gear unit 13 and a main gear unit 15. The split gear unit 13 comprises cogwheels 21, 23 which are mounted on the input shaft 10 and gears 32, 34 which are attached on the lay shaft lay shaft 16, which cogwheels 21, 23 and gears 32, 34 engage with each other and form two gear sets 50, 52 with different gear ratios. These gear ratios are usually referred to as high split and low split. The connection of the cogwheels 21, 23 on the input shaft 10 is carried out with one or several axially shiftable sleeves 54, 56, which are shifted axially with non-displayed maneuvering forks. The split gear unit 13 may be designed with or without a neutral state. In the event it is designed without a neutral state, one of the cogwheels 21, 23 is connected with the input shaft 10 at the same time as the second cogwheel 21, 23 is disconnected from the input shaft 10.

The main gear unit 15 comprises, according to the embodiment displayed, three gear sets 58, 60, 62 which connect the lay shaft 16 with the main shaft 14. Each gear set 58-62 comprises cogwheels 25, 27, 29 which are mounted on the main shaft 14 and gears 36, 38, 40 which are attached on the lay shaft 16, which cogwheels 25-29 and gears 36-40 engage with each other in the respective gear sets 58-62. The gear sets 58-62 have different gear ratios. The connection of the cogwheels 25-29 on the input shaft 10 is carried out with one or several axially shiftable sleeves 64, 66, and 68, which are shifted axially with non-displayed maneuvering forks. It is possible to set the main gear unit 15 in a neutral state by bringing the shiftable sleeves 64-68 out of engagement with the respective cogwheels 25-29 on the main shaft 14.

The speed sensors 42-46 are, as mentioned above, arranged at the input shaft 10, the lay shaft 16 and the main shaft 14, in order to detect the speed of the respective shafts 10, 16, 14. Between the main shaft 14 and the output shaft 18, a retarder 22 is arranged. However, the retarder 22 may be excluded, so that the main shaft 14 is connected directly with the output shaft 18. It is also possible to connect a range gearbox (not displayed) to the output shaft 18, with the objective of achieving a greater number of gear ratio possibilities in the vehicle 1.

A shifting that involves a change of gears in the gearbox 6 will be described, below, with reference to FIGS. 2 and 3.

The main shaft 14 and the output shaft 18 are in rigid engagement with one another during the shifting operation, which means that the main shaft 14 has a rotation speed determined by the rotation speed of the output shaft 18, and thus by the driving shaft 48 operated by the vehicle 1 (FIG. 2) and the propeller shaft 7 (FIG. 1), and the synchronous speed to be achieved to complete the shifting operation is that of the lay shaft 16. First, the main gear unit 15 is brought into a neutral state, the split gear unit 13 is shifted to a new gear, and the electric machine 4 is controlled so that it achieves the speed of the input shaft 10, which has been calculated for the new gear to be selected, whereupon the synchronisation means 70 of the split gear unit 13 is controlled to start the connection of the input shaft with the lay shaft, by initiating the engagement of the newly selected cogwheel 21 or 23 with the input shaft 10. This will result in a deceleration or acceleration of the lay shaft 16, depending on which cogwheel, 21 or 23, is connected. When the speed of the input shaft 10 and the lay shaft 16 have been synchronized with each other, and are connected via the selected gear set 50 or 52, the electric machine 4 is controlled to achieve a synchronous speed between the lay shaft 16 and the main shaft 14, in order to be able to impact the selected sleeve 64-68 in question in the main gear device 15, to initiate the engagement of the respective cogwheels 25-29 with the main shaft 14. When the lay shaft 16 and the main shaft 14 have achieved a synchronous speed, and a substantially zero torque state has arisen between the lay shaft 16 and the main shaft 14, the selected sleeve 64-68 is connected, for connection of the selected cogwheel 64-68 with the main shaft 14. The lay shaft 16 is thus connected with both the main shaft 14 and the input shaft 10, which entails that a torque may be added to the powertrain 2 via the electric machine 4 and/or the combustion engine 3, by way of connection of the combustion engine 3 through the coupling device 12. The synchronisation means 70 of the split gear device 13 may consist of conventional synchronisation rings (not displayed).

Figure 4:
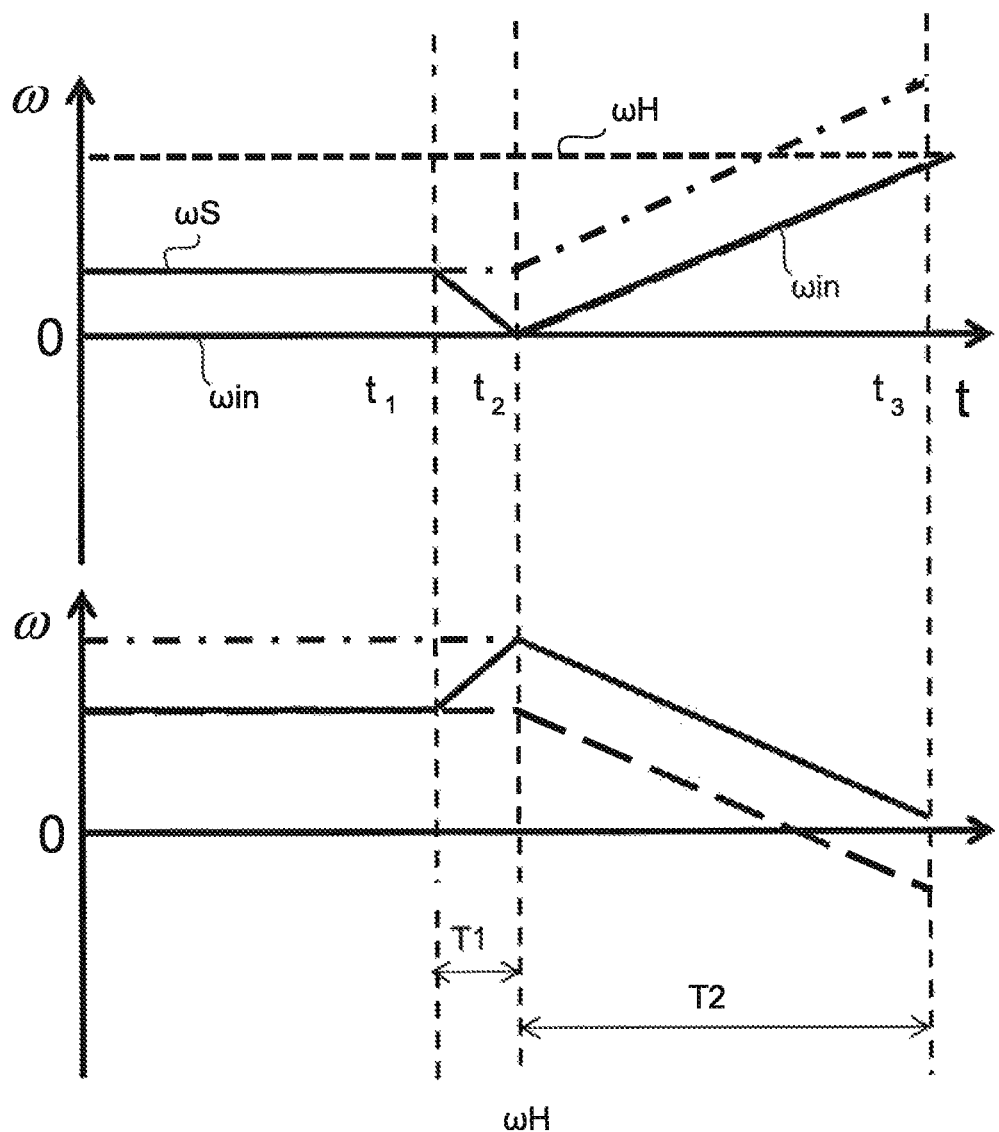
FIG. 4 shows a diagram of a sequential shifting in a vehicle with a hybrid powertrain according to the present invention.

The above described shifting process thus takes place sequentially, and may also be described with the diagram in FIG. 4. The top graph in FIG. 4 shows how an up-shift occurs from high split to low split in the split gear unit 13 and how, subsequently, a down-shift is carried out in the main shift device 15 in a sequence. At the point in time t1, the synchronisation of the speed of the lay shaft 16 with the speed of the input shaft 10 is initiated. The speed of the lay shaft 16 is represented by the solid curve $\omega S$ in the top graph in FIG. 4. The lay shaft 16 will, with the help of the synchronisation means 70 at the input shaft 10, be braked to a speed corresponding to that of the input shaft 10, having regard to the gear ratio via the split gear device 13. In the event the gear ratio through the split gear device 13 should be 1:1, the lay shaft 16 would achieve the same speed as the speed of the input shaft 10. Since there is a gear ratio in the split gear device 13, the lay shaft 6 will be braked to the speed of the input shaft 10, converted to the gear ratio through the gear set 50, 52, which is connected to the split gear device 13. Thus, the meaning of the expression synchronization of the speed of the shafts 10, 14, 16 with each other will always comprise a conversion to the gear ratio between them. This converted engine speed is represented by the line $\omega$ in the top graph, and represents the speed of the input shaft 10 converted into the speed of the lay shaft 16 with the gear ratio in the split gear device 13, regarding the gear that is to be engaged in the split gear unit 13. The dashed line represents the speed of the input shaft 10, converted into the gear ratio which existed before the change of gears in the split gear unit 13. At the point in time t2, the lay shaft 16 has achieved a synchronous speed with the speed of the input shaft 10 ωin, so that the synchronisation of the speed of the lay shaft 16 is carried out during the time period T1. Subsequently, the synchronisation of the speed ωS of the lay shaft 16 in relation to the speed of the main shaft 14 is initiated, having regard to the gear ratio through the main gear device 15. Such speed is represented by the dashed line ωH in the top graph. The speed ωS of the lay shaft 16 is accelerated with the electric machine 4 and reaches the main shaft's 14 converted speed ωH at the point in time t3, so that the cogwheel 25-29 for the selected gear is connected with the main shaft 14 via a coupling sleeve 64-68. Thus, the synchronization of the speed of the lay shaft 16 with the converted speed of the main shaft 14 has been completed during the time period T2. The total time for the shifting process thus becomes the total time T1 and T2.

Similar shifting processes may be described for a reverse shifting in the gearbox 6 via the bottom diagram in FIG. 4.

Preferably, a shifting operation is carried out according to the inventive method, when both the input shaft 10 and the lay shaft 16 will be accelerated simultaneously or decelerated simultaneously during the synchronisation process. Thus, the total time T1 and T2 may be considerably reduced, since the synchronisation of the speed of the lay shaft 16 with the speed of the input shaft 10 is initiated at the same time as the speed of the lay shaft 10 is synchronized with the speed of the main shaft 14. Such a shifting operation is displayed in FIG. 5.

At the point in time t1, the synchronisation of the speed of the lay shaft 16 with the speed of the input shaft 10 is initiated. The speed of the lay shaft 16 is represented by the solid curve ωS in the top graph in FIG. 5. The lay shaft 16 will, with the help of the synchronisation means 70 at the input shaft 10, be accelerated to a speed corresponding to that of the of the input shaft 10, having regard to the gear ratio via the split gear device 13. Since there is a gear ratio in the split gear device 13, the lay shaft 16 will be accelerated to the speed of the input shaft 10, converted to the gear ratio through the gear set 50, 52, which is connected to the split gear device 13. This converted engine speed is represented by the line ω in the top graph, and represents the speed of the input shaft 10 converted into the speed of the lay shaft 16, with the gear ratio in the split gear device 13 for the gear that is to be engaged in the split gear unit 13. The dashed line represents the speed of the input shaft 10 converted into the gear ratio which existed before the change of gears in the split gear unit 13. At the point in time t2, the lay shaft 16 has achieved a synchronous speed with the speed win of the input shaft 10, so that the synchronization of the speed of the lay shaft 16 is carried out during the time period T1. At the point in time t1, the synchronization of the speed ωS of the lay shaft 16 in relation to the speed of the main shaft 16 is initiated, having regard to the gear ratio through the main gear device 15. Such speed is represented by the dashed line ωH in the top graph. The speed ωS of the lay shaft 16 is thus accelerated with the synchronization device 70 for the split gear unit 13, also to initiate the synchronization of the speed of the lay shaft 16 with the converted speed of the main shaft 14. At the point in time t2, the input shaft 10 and the lay shaft 16 operate synchronously, entailing that the input shaft 10 and the lay shaft 16 are connected via one of the gear sets 50, 52 on the input shaft 10 and the lay shaft 16 at the point in time t2. Thus the lay shaft 16 is accelerated with the electric machine 4 via the input shaft 10, so that the lay shaft 16 achieves a synchronous speed ωS with the converted speed ωH of the main shaft 14 at the point in time t3, whereupon the cogwheel 25-29 for the selected gear is connected with the main shaft 14 via a coupling sleeve 64-68. Thus, the synchronization of the speed ωS of the lay shaft 16 with the converted speed win of the input shaft 10 and the converted speed ωH of the main shaft 14 has been completed during the time period T2. The total time for the shifting process thus becomes the time T2.

Figure 5:
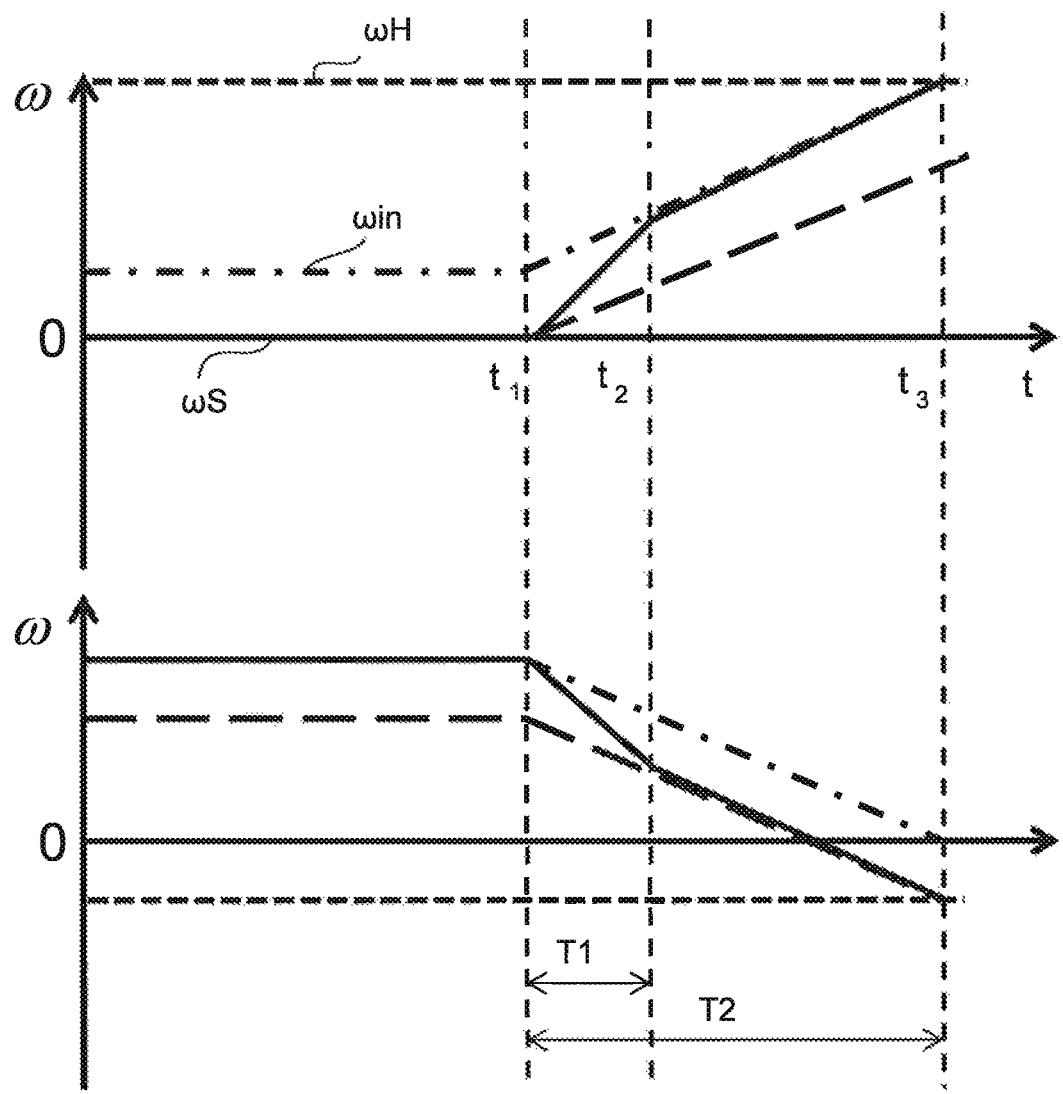
FIG. 5 shows a diagram of a shifting in a vehicle with a hybrid powertrain according to the present invention.

Similar shifting processes may be described for an upshift in the gearbox 6 with the bottom diagram in FIG. 5.

In the context, it should be mentioned that if a shifting operation will be carried out and if the lay shaft 16 will be accelerated or decelerated in the opposite direction in relation to the acceleration or deceleration of the input shaft 10, the shifting process described in connection with FIG. 5 will not be possible, since the synchronization device 70 in the split gear unit 13 will not be able to handle such a synchronization without a risk of defective synchronization, with a resulting scraping sound. Instead, this requires the sequential shifting process described in connection with FIG. 4.

Figure 6:
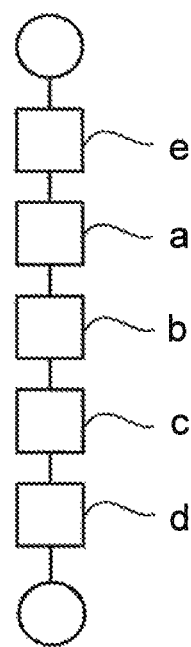
FIG. 6 shows a flow chart of a shifting in a vehicle with a hybrid powertrain according to the present invention.

FIG. 6 shows a flow chart of the method for shifting in a vehicle 1 with a hybrid powertrain 2 according to the present invention. The method comprises the following steps:

a) to bring the main gear unit 15 into a substantially zero torque state;

b) in the event the input shaft 10 and the lay shaft 16 must both be accelerated or decelerated: to initiate synchronization of the speed of the lay shaft 16 with, on the one hand, the speed of the input shaft 10, and, on the other hand, the speed of the main shaft 14, at a joint point in time t1;

c) to engage the gear in the split gear unit 13 when the speed of the lay shaft 16 speed has been synchronized with the speed of the input shaft 10 at a second point in time t2, and d) to engage the gear in the main gear unit 15 when the speed of the lay shaft 16 has been synchronized with the speed of the main shaft 14 at a third point in time t3.

Preferably, the speed of the respective shafts 10, 14, 16 is detected with a first speed sensor 42 arranged at the input shaft 10, a second speed sensor 44 arranged at the lay shaft 16 and/or a third speed sensor 46 arranged at the main shaft 14.

Since the gear ratio depending on the gear engaged is known, it is possible to calculate the speed of one of the shafts 10, 14, 16, based on knowledge of the speed of two of the shafts 10, 14, 16. Thus, it would be possible to equip only two of the shafts 10, 14, 16 with speed sensors.

Preferably, the synchronization in step b) is carried out with a synchronization means 70 arranged at the split gear unit 13.

Preferably, the speed of the lay shaft 16 and the speed of the main shaft 14 are synchronized between the steps c) and d), by accelerating or decelerating the electric machine 4 between the second point in time t2 and the third point in time t3.

The method also comprises the additional step, before step a):

e) of disconnecting the combustion engine 3 from the input shaft 10 via a coupling device 12.

Preferably, the synchronization and the shifting are controlled via an electronic control device 26.

According to the invention, a computer program P is provided, which may comprise procedures for shifting in a vehicle 1 with a hybrid powertrain 2 according to the present invention.

The computer program P may comprise procedures for shifting in a vehicle 1 with a hybrid powertrain 2 according to the method steps specified above.

The program P may be stored in an executable manner, or in a compressed manner, in a memory M and/or a read/write memory R.

The invention also relates to a computer program product, comprising program code stored in a medium readable by a computer 30, to perform the method steps specified above, when the program code is executed in the electronic control device 26, or another computer 30 connected to the control device 26.

The components and features specified above may, within the framework of the invention, be combined between different embodiments specified.

The invention claimed is:

1. A method for shifting in a vehicle with a hybrid powertrain,
   the vehicle comprising:
   a combustion engine and an electric machine both configured and operable to drive the vehicle;
   a gearbox having an input shaft and a main shaft, wherein the combustion engine and the electric machine are connected to the input shaft; and
   a lay shaft which is connected via gear sets to the input shaft and to the main shaft, to form a split gear unit and a main gear unit, the split gear unit having a synchronizer;
   the method comprising the following steps:
   a) bringing the main gear unit into a substantially zero torque state;
   b) initiating, at a first point in time $t_1$, synchronization of speed of the lay shaft with the speed of the input shaft, and synchronization of speed of the lay shaft with the speed of the main shaft;
   c) engaging the gear in the split gear unit when the speed of the lay shaft has been synchronized with the speed of the input shaft at a second point in time $t_2$; and
   d) engaging the gear in the main gear unit when the speed of the lay shaft has been synchronized with the speed of the main shaft at a third point in time $t_3$;
   performing the synchronization of the speed of the lay shaft with the speed of the input shaft in step b) with the synchronizer arranged at the split gear unit, wherein the synchronizer comprises synchronization rings.

2. A method according to claim 1; further comprising:
   detecting the speeds of the respective shafts with a first speed sensor arranged at the input shaft, a second speed sensor arranged at the lay shaft and/or a third speed sensor arranged at the main shaft.

3. A method according to claim 1, further comprising between the steps c) and d): synchronizing the speed of the lay shaft and the speed of the main shaft by accelerating or decelerating the electric machine between the second point in time ($t_2$) and the third point in time ($t_3$).

4. A method according to claim 1, further comprising before step a):
   e) disconnecting the combustion engine from the input shaft via operating a coupling device.

5. A method according to claim 1, controlling the synchronizations and the engaging steps with an electronic control device.

6. A hybrid powertrain comprising elements configured and adapted to perform the method according to claim 1.

7. A vehicle, comprising a hybrid powertrain according to claim 6.

8. A computer program product, comprising a program for shifting in a vehicle with a hybrid powertrain and the program being stored in a non-transitory medium readable by a computer, wherein the computer program (P) comprises program code to cause an electronic control device, or another computer connected to the electronic control device, to perform the method steps according to claim 1, when the program code is executed in an electronic control device or in another computer connected to the electronic control device.

9. A method according to claim 1, wherein the speed of the lay shaft is synchronized with the speed of the input shaft by controlling the electric machine, and the speed of the lay shaft is synchronized with the speed of the main shaft by controlling the electric machine.

10. A method according to claim 1, wherein the synchronization of the speed of the lay shaft and the input shaft and the synchronization of the speed of the lay shaft and the main shaft are performed by controlling the electric machine exclusively.

* * * * *